United States Patent [19]
Yasuda

[11] Patent Number: 5,861,969
[45] Date of Patent: Jan. 19, 1999

[54] INFRARED SIGNAL TRANSMITTING APPARATUS

[75] Inventor: Yuichi Yasuda, Fukushima-ken, Japan

[73] Assignee: Alps Electric Co., Ltd., Japan

[21] Appl. No.: 806,867

[22] Filed: Feb. 25, 1997

[30] Foreign Application Priority Data

May 3, 1996 [JP] Japan ..................................... 8-47467

[51] Int. Cl.[6] .................................................. H04B 10/00
[52] U.S. Cl. .......................... 359/152; 359/143; 359/172; 359/180
[58] Field of Search .................................. 359/143, 152, 359/172, 180, 175, 174, 108; 364/713; 340/825.72

[56] References Cited

U.S. PATENT DOCUMENTS

| | | | |
|---|---|---|---|
| 4,249,266 | 2/1981 | Nakamori | 359/152 |
| 5,247,380 | 9/1993 | Lee et al. | 359/118 |
| 5,600,471 | 2/1997 | Hirohashi et al. | 359/152 |

*Primary Examiner*—Knife-Michael Negash
*Attorney, Agent, or Firm*—Brinks Hofer Gilson & Lione

[57] ABSTRACT

An infrared signal transmitting apparatus provided by the present invention comprises an infrared light emitting device for transmitting high-speed signals, a plurality of infrared light emitting devices for transmitting low-speed signals which are distributed and laid out in such a way that, as a whole, a wide directivity is obtained, a high-speed-signal driving circuit for driving the infrared light emitting device for transmitting high-speed signals in accordance with a high-speed signal (data signal) received from a computer, a low-speed-signal driving circuit for driving the plural infrared light emitting devices for transmitting low-speed signals at the same time in accordance with a low-speed signal (remote-control signal) received from the computer, and logic means for allowing the high-speed-signal driving circuit to drive the infrared light emitting device for transmitting high-speed signals in accordance with the low-speed signal. When a remote-control signal is received from the computer, not only do the infrared light emitting devices for transmitting low-speed signals each transmit an infrared signal, but the infrared light emitting device for transmitting high-speed signals also outputs an infrared signal as well.

3 Claims, 3 Drawing Sheets

INFRARED SIGNAL TRANSMITTING APPARATUS

BACKGROUND OF THE INVENTION

1. Field of the Invention

In general, the present invention relates to an infrared signal transmitting apparatus. In particular, the present invention relates to an infrared signal transmitting apparatus which is connected to a computer and used for exchanging high-speed signals with the computer by using infrared signals as well as transmitting low-speed signals from the computer by using infrared signals each having a wide directivity.

2. Description of the Related Art

In general, an infrared signal transmitting apparatus is used in connection with a computer by a wire. The infrared signal transmitting apparatus typically comprises a single infrared light emitting device for transmitting high-speed signals, a single light receiving device for receiving high-speed signals and a plurality of infrared light emitting devices for transmitting low-speed signals which are distributed and laid out in such a way that, as a whole, a wide directivity is obtained. The infrared light emitting device for transmitting high-speed signals transmits a high-speed signal such as a data signal received from the wire-connected computer to another computer or another kind of equipment as an infrared signal. The light receiving device for receiving high-speed signals receives an infrared signal transmitted by another computer and transmits the infrared signal to the wire-connected computer as a data signal. The infrared light emitting devices for transmitting low-speed signals are each used for transmitting a low-speed signal received from the wire-connected computer such as a remote-control signal to a television (TV) or a video tape recorder (VTR) as an infrared signal. The remote-control signal is used for remotely controlling the television or the video tape recorder.

FIG. 2 is a perspective view of a typical configuration of the conventional infrared signal transmitting apparatus. FIG. 3 is a block configuration diagram showing a typical internal configuration of the conventional infrared signal transmitting apparatus shown in FIG. 2.

As shown in FIG. 2, the conventional infrared signal transmitting apparatus 20 comprises a cabinet 21 having substantially a rectangular parallelopiped shape with four side surfaces in addition to top and bottom surfaces to give a total of six surfaces, a infrared light emitting device 22 for transmitting high-speed signals and a light receiving device 23 for receiving high-speed signals provided on one of the side surfaces at the same altitude, first to third infrared light emitting devices 24, 25 and 26 for transmitting low-speed signals provided on the respective three remaining side surfaces. The infrared signal transmitting apparatus 20 is connected to a computer 28 by a wire 27. Data is exchanged between the computer 28 and another computer 29 such as a notebook personal computer located in close proximity to the computer 28 with infrared signals.

As shown in FIG. 3, the infrared signal transmitting apparatus 20 also has a controller 30, a high-speed-signal modulating/demodulating circuit 31, a high-speed-signal driving circuit 32, a high-speed-signal receiving circuit 33, a low-speed-signal demodulating circuit 34 and a low-speed-signal driving circuit 35 in addition to the infrared light emitting device 22, the light receiving device 23 and the first to third infrared light emitting devices 24, 25 and 26 shown in FIG. 2.

The controller 30 is connected to the computer 28 by the wire 27 as well as to the input/output terminal of the high-speed-signal modulating/demodulating circuit 31 and to the input terminal of the low-speed-signal demodulating circuit 34. The output terminal of the high-speed-signal modulating/demodulating circuit 31 is connected to the input terminal of the high-speed-signal driving circuit 32 and its input terminal is connected to the output terminal of the high-speed-signal receiving circuit 33. The output terminal of the low-speed-signal demodulating circuit 34 is connected to the input terminal of the low-speed-signal driving circuit 35. The output terminal of the high-speed-signal driving circuit 32 is connected to the infrared light emitting device 22. The input terminal of the high-speed-signal receiving circuit 33 is connected to the light receiving device 23. Finally, the output terminal of the low-speed-signal driving circuit 35 is connected to the first to third infrared light emitting devices 24, 25 and 26 which are connected in series.

The infrared signal transmitting apparatus 20 with the configuration described above operates as follows.

First of all, in the case of an exchange of data between the computer 28 and the other computer 29, the computer 28 supplies the infrared signal transmitting apparatus 20 with a transmission signal including data to be transmitted to the other computer 29 by way of the connection wire 27. The controller 30 identifies the received transmission signal, supplying it to the high-speed-signal modulating/demodulating circuit 31. The high-speed-signal modulating/demodulating circuit 31 demodulates the transmission signal and the modulated signal is supplied to the high-speed-signal driving circuit 32. The high-speed-signal driving circuit 32 drives the infrared light emitting device 22 for transmitting high-speed signals in accordance with the demodulated signal. The infrared light emitting device 22 transmits a first infrared signal including the data signal to the other computer 29.

When a second infrared signal including a data signal is transmitted by the other computer 29 to the infrared signal transmitting apparatus 20, on the other hand, the light receiving device 23 for receiving high-speed signals receives the second infrared signal. The high-speed-signal receiving circuit 33 generates an electrical signal representing the second infrared signal, supplying the electrical signal to the high-speed-signal modulating/demodulating circuit 31. The high-speed-signal modulating/demodulating circuit 31 modulates the electrical signal supplied thereto, converting it into a transmission signal which is then supplied to the controller 30. The controller 30 identifies the transmission signal supplied thereto, transmitting it to the computer 28 by way of the connection wire 27.

In this way, data is exchanged between the computer 28 and the other computer 29 by using the first and second infrared signals.

Next, when the computer 28 transmits a remote-control signal to a television or a video tape recorder not shown in the figure, first of all, the computer 28 supplies a transmission signal including the remote-control signal to the infrared signal transmitting apparatus 20 by way of the connection wire 27. The controller 30 identifies the received transmission signal, supplying it to the low-speed-signal demodulating circuit 34. The low-speed-signal demodulating circuit 34 demodulates the transmission signal and the demodulated signal is supplied to the low-speed-signal driving circuit 35. The low-speed-signal driving circuit 35 drives the three first to third infrared light emitting devices 24, 25 and 26 for transmitting low-speed signals in accordance with the demodulated signal. The three first to third infrared light emitting devices 24, 25 and 26 each transmit an infrared signal including the remote-control signal to the television or the video tape recorder. The operation of the television or the video tape recorder is controlled by the remote-control signal.

In the conventional infrared signal transmitting apparatus 20 described above, when an infrared signal conveying a data signal is transmitted, the receiver or transmitter of the infrared signal is specified. For this reason, the infrared light emitting device 22 for transmitting high-speed signals or the light receiving device 23 for receiving high-speed signals has a sharp directivity with respect to the receiver or transmitter of the infrared signal.

When an infrared signal conveying a remote-control signal is transmitted, on the other hand, normally, no receiver of the infrared signal is specified. For this reason, a plurality of infrared light emitting devices for transmitting low-speed signals are required to provide directivities in all directions. In the particular case of the infrared signal transmitting apparatus 20 shown in FIGS. 2 and 3, three devices, that is, the first to third infrared light emitting devices 24, 25 and 26 for transmitting low-speed signals, are employed.

By the way, even if the three devices, that is, the first to third infrared light emitting devices 24, 25 and 26, are employed in the conventional infrared signal transmitting apparatus 20, at the most, the infrared signal transmitting apparatus 20 covers only a transmission range of an infrared signal conveying a remote-control signal for three directions in which the three devices, that is, the first to third infrared light emitting devices 24, 25 and 26, are employed. The infrared signal transmitting apparatus 20 has a problem that the transmission range of an infrared signal conveying a remote-control signal does not cover a direction in which the infrared light emitting device 22 for transmitting high-speed signals and the light receiving device 23 for receiving high-speed signals are provided.

It stands to reason that, if a fourth infrared light emitting device for transmitting low-speed signals is newly installed in the direction in which the infrared light emitting device 22 and the light receiving device 23 are provided, the problem described above can be solved. By installing the fourth infrared light emitting device, however, not only the number of components and the amount of consumed power are increased, but the infrared signal transmitting apparatus 20 also becomes inevitably bigger in size. As a result, the infrared signal transmitting apparatus 20 introduces a new problem that the manufacturing cost thereof also rises as well.

SUMMARY OF THE INVENTION

The present invention addresses these problems. It is thus an object of the present invention to provide an infrared signal transmitting apparatus capable of widening the transmission range of infrared signals without increasing the number of components employed therein, the amount of power consumed thereby and the size thereof.

In order to achieve the object described above, in the infrared signal transmitting apparatus, there is provided, at the input side of the high-speed-signal driving circuit, logic means with two input terminals and one output terminal wherein one of the input terminals is connected to a line supplying high-speed signals, the other input terminal thereof is connected to a line supplying low-speed signals and the output terminal thereof is connected to the input terminal of the high-speed-signal driving circuit.

By employing the logic means described above, when a low-speed signal is received from the computer, that is, when a transmission signal conveying a remote-control signal is received from the computer, the remote-control signal is supplied to the plurality of infrared light emitting devices for transmitting low-speed signals by way of the low-speed-signal demodulating circuit and the low-speed-signal driving circuit as is the case with the conventional infrared signal transmitting apparatus. Not only the plural infrared light emitting devices each transmit an infrared signal conveying the remote-control signal but, at the same time, the low-speed-signal demodulating circuit also supplies the low-speed signal to the infrared light emitting device for transmitting high-speed signals by way of the logic means and the high-speed-signal driving circuit. In this way, since the infrared light emitting device also transmits an infrared signal conveying the remote-control signal, there is no need to deliberately increase the number of installed infrared light emitting devices for transmitting low-speed signals and yet the transmission range of infrared signals can be made wider than that of the conventional infrared signal transmitting apparatus.

An infrared signal transmitting apparatus provided by one aspect of the present invention comprises: at least one infrared light emitting device for transmitting high-speed signals; at least one infrared light emitting device for transmitting low-speed signals laid out in a way so as to give a wide directivity; a high-speed-signal driving circuit for driving the infrared light emitting device for transmitting high-speed signals in accordance with a high-speed signal received from a computer; a low-speed-signal driving circuit for driving the infrared light emitting device for transmitting low-speed signals in accordance with a low-speed signal received from the computer; and logic means for letting the high-speed-signal driving circuit also drive the infrared light emitting device for transmitting high-speed signals in accordance with the low-speed signal. In this case, a two-input OR circuit is used as the logic means. One of the input terminals of the two-input OR circuit is connected to a line supplying high-speed signals, the other input terminal thereof is connected to a line supplying low-speed signals and its output terminal is connected to the input terminal of the high-speed-signal driving circuit.

In addition, the infrared signal transmitting apparatus provided by the aspect also includes at least one light receiving device for receiving high-speed signals provided at the same altitude as the infrared light emitting device for transmitting high-speed signals, and high-speed-signal transmitting means for transmitting a high-speed signal received from the light receiving device for receiving high-speed signals to the computer.

A high-speed signal such as a data signal transmitted by the wire-connected computer to the infrared signal transmitting apparatus drives the infrared light emitting device for transmitting high-speed signals through the high-speed-signal driving circuit. The infrared light emitting device transmits a first infrared signal including the high-speed signal (data signal) to the other computer. When a second infrared signal including a high-speed signal (data signal) is transmitted by the other computer to the infrared signal transmitting apparatus, on the other hand, the light receiving device for receiving high-speed signals receives the second infrared signal. The high-speed signal (data signal) is then transmitted to the wire-connected computer by way of the high-speed-signal transmitting means. In this way, data is exchanged between the wire-connected computer and the other computer by using the first and second infrared signals.

A low-speed signal such as a remote-control signal transmitted by the computer to the infrared signal transmitting apparatus drives the at least one infrared light emitting device for transmitting low-speed signals through the low-speed-signal driving circuit. The infrared light emitting device transmits an infrared signal conveying the low-speed signal (remote-control signal) to a television (TV) or a video tape recorder (VTR). At the same time, a signal output by the low-speed-signal demodulating circuit drives the infrared light emitting device for transmitting high-speed signals through the logic means (OR circuit). Driven as such, the infrared light emitting device for transmitting high-speed signals also transmits an infrared signal conveying the low-speed signal (remote-control signal) to a television (TV) or a video tape recorder (VTR).

As described above, according to the present invention, when a low-speed signal is supplied to the infrared signal transmitting apparatus, that is, when a transmission signal including a remote-control signal is supplied to the infrared signal transmitting apparatus from the wire-connected computer, not only is the remote-control signal supplied to the at least one infrared light emitting device for transmitting low-speed signals through the low-speed-signal driving circuit, allowing the infrared light emitting device for transmitting low-speed signals to transmit an infrared signal conveying the remote-control signal as is the case with the conventional infrared signal transmitting apparatus, but the remote-control signal is also supplied to the infrared light emitting device for transmitting high-speed signals through the logic means and the high-speed-signal driving circuit, allowing the infrared light emitting device for transmitting high-speed signals also to transmit an infrared signal conveying the remote-control signal. As a result, the transmission range of infrared signals can be made wider than that of the conventional infrared signal transmitting apparatus, without increasing the number of components, the amount of consumed power, and the size of the infrared signal transmitting apparatus due to otherwise a greater number of installed infrared light emitting devices for transmitting low-speed signals.

BRIEF DESCRIPTION OF THE DIAGRAMS

The above and other objects, features as well as many of attendant advantages of the present invention will be readily appreciated as the same becomes better understood by reference to the following figures showing the embodiment of the present invention wherein.

DESCRIPTION OF THE PREFERRED EMBODIMENT

Figure 1:
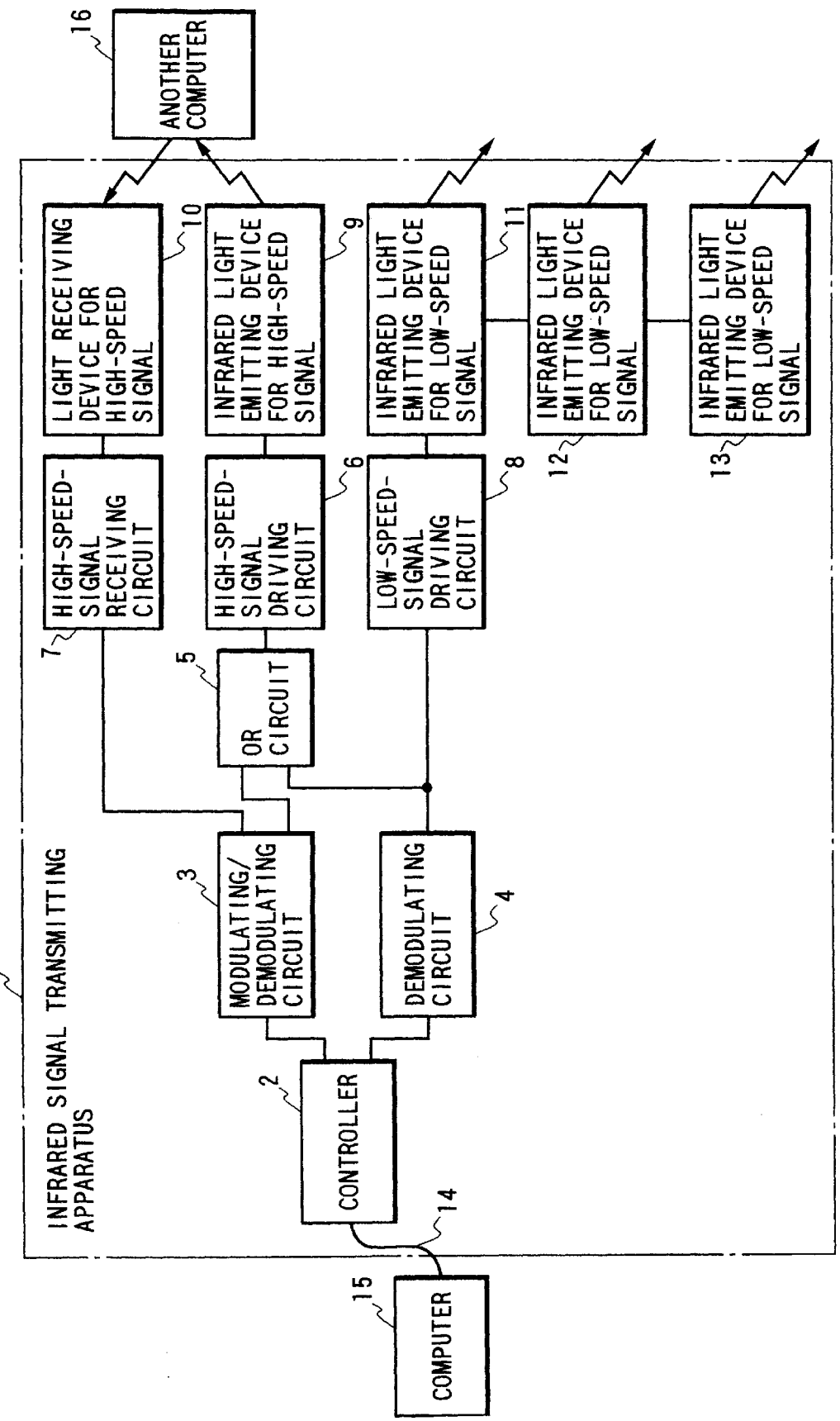
FIG. 1 is a block configuration diagram showing an infrared signal transmitting apparatus provided by an embodiment of the present invention.

FIG. 1 is a block configuration diagram showing an infrared signal transmitting apparatus provided by an embodiment of the present invention.

As shown in FIG. 1, the infrared signal transmitting apparatus 1 comprises a controller 2, a high-speed-signal modulating/demodulating circuit 3, a low-speed-signal demodulating circuit 4, a two-input OR circuit (logic means) 5, a high-speed-signal driving circuit 6, a high-speed-signal receiving circuit 7, a low-speed-signal driving circuit 8, an infrared light emitting device 9 for transmitting high-speed signals, a light receiving device 10 for receiving high-speed signals, first to third infrared light emitting devices 11, 12 and 13 each for transmitting low-speed signals.

The controller 2 is connected to a computer 15 by a wire 14 as well as to the input/output terminal of the high-speed-signal modulating/demodulating circuit 3 and to the input terminal of the low-speed-signal demodulating circuit 4. The output terminal of the high-speed-signal modulating/demodulating circuit 3 is connected to one of the two input terminals of the OR circuit 5 and its input terminal is connected to the output terminal of the high-speed-signal receiving circuit 7. The output terminal of the low-speed-signal demodulating circuit 4 is connected to the other input terminal of the OR circuit 5 and to the input terminal of the low-speed-signal driving circuit 8. The output terminal of the OR circuit 5 is connected to the input terminal of the high-speed-signal driving circuit 6. The output terminal of the high-speed-signal driving circuit 6 is connected to the input terminal of the infrared light emitting device 9 for transmitting high-speed signals. The input terminal of the high-speed-signal receiving circuit 7 is connected to the light receiving device 10 for receiving high-speed signals. Finally, the output terminal of the low-speed-signal driving circuit 8 is connected to the first to third infrared light emitting devices 11, 12 and 13 for transmitting low-speed signals which are connected in series. In addition, another computer 16 such as a notebook personal computer is located in close proximity to the infrared signal transmitting apparatus 1. The other computer 16 is capable of exchanging an infrared signal with the computer 15 by way of the infrared light emitting device 9 for transmitting high-speed signals and the light receiving device 10 for receiving high-speed signals.

Figure 2:
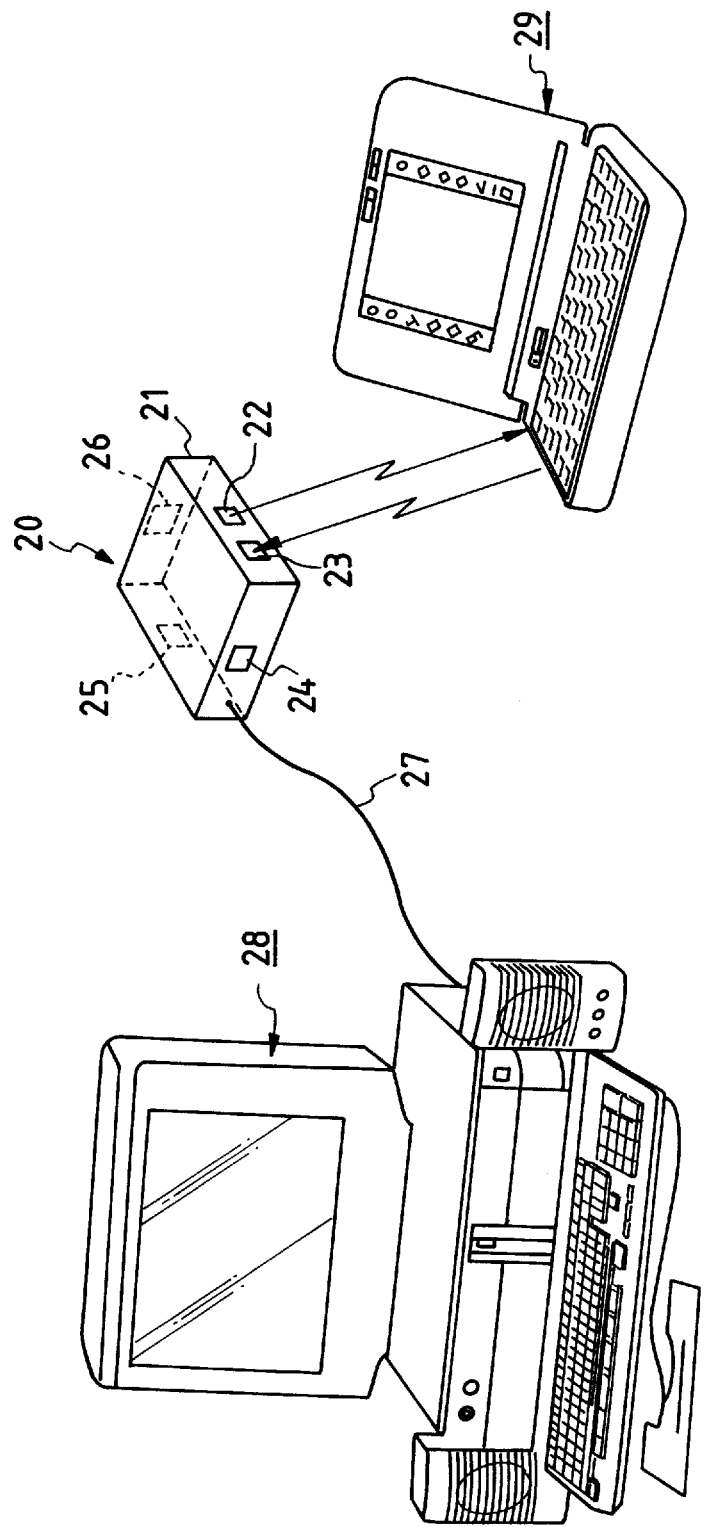
FIG. 2 is a perspective view of a typical configuration of a conventional infrared signal transmitting apparatus.
Figure 3:
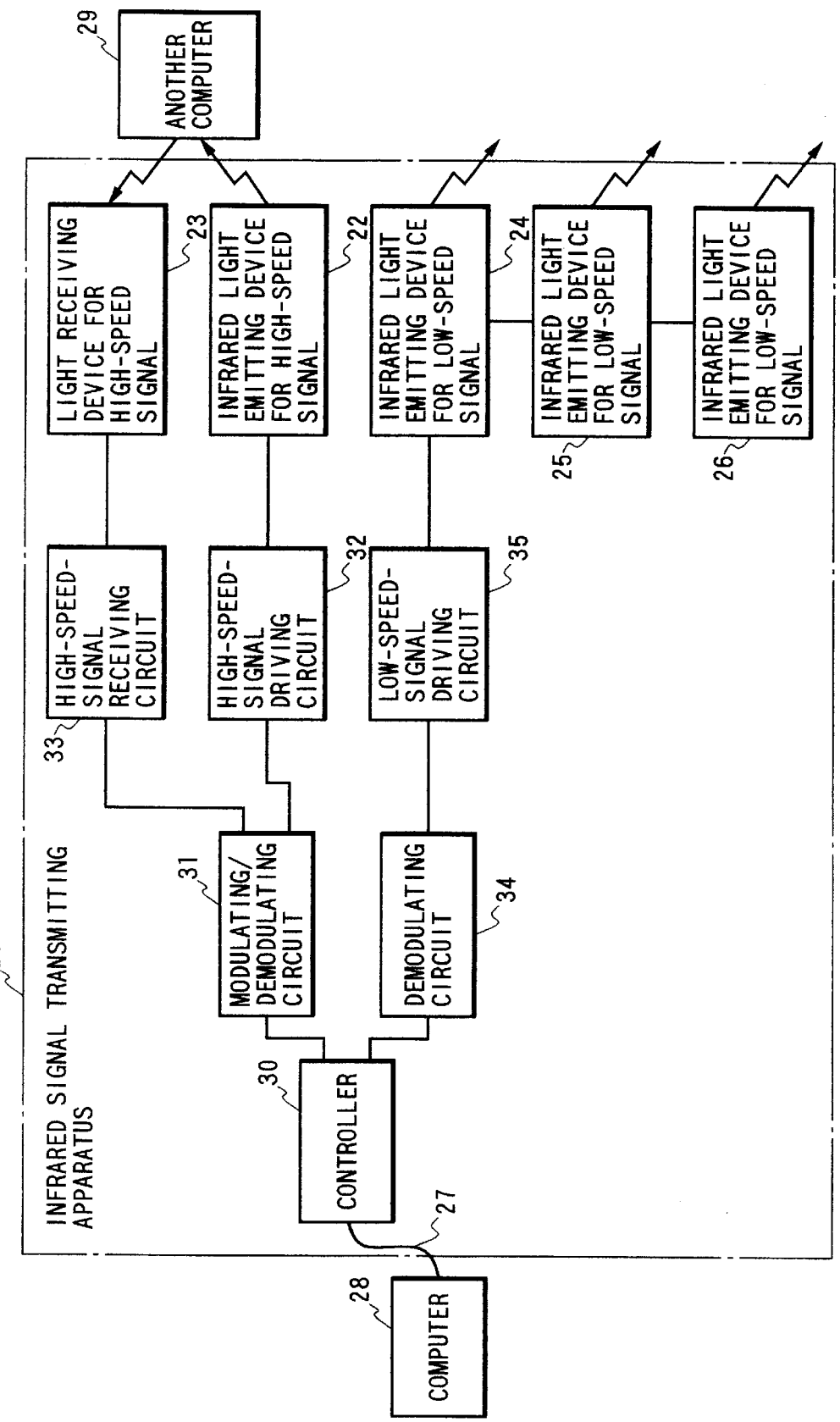
FIG. 3 is a block configuration diagram showing a typical internal configuration of the conventional infrared signal transmitting apparatus shown in FIG. 2.

The structure of the cabinet of the infrared signal transmitting apparatus 1 is the same as the cabinet 21 of the conventional infrared signal transmitting apparatus 20 shown in FIG. 2. It should be noted though that the cabinet itself is not shown in the figure. By the same token, the layout of the infrared light emitting device 9 for transmitting high-speed signals, the light receiving device 10 for receiving high-speed signals and the first to third infrared light emitting devices 11, 12 and 13 for transmitting low-speed signals is the same as that of the infrared light emitting device 22 for transmitting high-speed signals, the light receiving device 23 for receiving high-speed signals and the first to third infrared light emitting devices 24, 25 and 26 for transmitting low-speed signals employed in the conventional infrared signal transmitting apparatus 20 shown in FIG. 2. That is to say, the infrared signal transmitting apparatus 1 comprises a cabinet having substantially a rectangular parallelopiped shape with four side surfaces in addition to top and bottom surfaces to give a total of six surfaces wherein the infrared light emitting device 9 for transmitting high-speed signals and the light receiving device 10 for receiving high-speed signals are provided on one of the side surfaces at the same altitude and the first to third infrared light emitting devices 11, 12 and 13 for transmitting low-speed signals are provided on the respective three remaining side surfaces.

The infrared signal transmitting apparatus 1 with the configuration described above operates as follows.

In the first place, in the case of an exchange of data between the computer 15 and the other computer 16 such as a notebook personal computer by means of infrared signals, the computer 15 supplies the infrared signal transmitting apparatus 1 with a transmission signal including data to be transmitted to the other computer 16 by way of the connection wire 14. The controller 2 identifies the received transmission signal, supplying it to the high-speed-signal modulating/demodulating circuit 3. The high-speed-signal modulating/demodulating circuit 3 demodulates the transmission signal, supplying a demodulated signal to one of the two input terminals of the OR circuit 5. At that time, a demodulated signal from the low-speed-signal demodulating circuit 4 is not supplied to the other input terminal of the OR circuit 5. Thus, the demodulated signal supplied by the high-speed-signal modulating/demodulating circuit 3 is passed on to the high-speed-signal driving circuit 6. The high-speed-signal driving circuit 6 drives the infrared light emitting device 9 for transmitting high-speed signals in accordance with the demodulated signal. The infrared light emitting device 9 transmits a first infrared signal including the data signal to the other computer 16.

When a second infrared signal including a data signal is transmitted by the other computer 16 to the infrared signal transmitting apparatus 1, on the other hand, the light receiving device 10 for receiving high-speed signals receives the second infrared signal. The high-speed-signal receiving circuit 7 generates an electrical signal representing the second infrared signal, supplying the electrical signal to the high-speed-signal modulating/demodulating circuit 3. The high-speed-signal modulating/demodulating circuit 3 modulates the electrical signal supplied thereto, converting it into a transmission signal which is then supplied to the controller 2. The controller 2 identifies the transmission signal supplied thereto, transmitting it to the computer 15 by way of the connection wire 14.

In this way, data is exchanged between the computer 15 and the other computer 16 by using the first and second infrared signals.

In the second place, when the computer 15 transmits an infrared signal conveying a remote-control signal to a television or a video tape recorder which is not shown in the figure, the computer 15 supplies a transmission signal including the remote-control signal to the infrared signal transmitting apparatus 1 by way of the connection wire 14. The controller 2 identifies the received transmission signal, supplying it to the low-speed-signal demodulating circuit 4. The low-speed-signal demodulating circuit 4 demodulates the transmission signal, supplying a demodulated signal to the other input terminal of the OR circuit 5 as well as to the low-speed-signal driving circuit 8. At that time, a demodulated signal from the high-speed-signal modulating/demodulating circuit 3 is not supplied to the one input terminal of the OR circuit 5. Thus, the demodulated signal supplied by the low-speed-signal demodulating circuit 4 is passed on to the high-speed-signal driving circuit 6. The high-speed-signal driving circuit 6 drives the infrared light emitting device 9 for transmitting high-speed signals in accordance with the demodulated signal. The infrared light emitting device 9 transmits a first infrared signal conveying the remote-control signal to the television or the video tape recorder. In addition, concurrently with the operation described above, the low-speed-signal driving circuit 8 drives the first to third infrared light emitting device 11, 12 and 13 for transmitting low-speed signals at the same time in accordance with the demodulated signal. The first to third infrared light emitting devices 11, 12 and 13 each transmit a second infrared signal including the remote-control signal to the television or the video tape recorder. The operation of the television or the video tape recorder is controlled by the remote-control signal included in the first and second infrared signals.

As described above, according to the present embodiment, not only the infrared light emitting devices for transmitting low-speed signals each transmit an infrared signal conveying the remote-control signal but, at the same time, the at least one infrared light emitting device for transmitting high-speed signals also transmits an infrared signal conveying the remote-control signal. There is consequently no need to deliberately increase the number of installed infrared light emitting devices for transmitting low-speed signals and yet the transmission range of infrared signals can be made wider than that of the conventional infrared signal transmitting apparatus.

As described above in detail, according to the present invention, when a low-speed signal is received from the computer, that is, when a transmission signal conveying a remote-control signal is received from the computer, the remote-control signal is supplied to the plurality of infrared light emitting devices for transmitting low-speed signals by way of the low-speed-signal driving circuit as is the case with the conventional infrared signal transmitting apparatus, to make the plural infrared light emitting devices for transmitting low-speed signals each transmit an infrared signal conveying the remote-control signal. At the same time, the remote-control signal is also supplied to the one infrared light emitting device for transmitting high-speed signals, to allow the infrared light emitting device for transmitting high-speed signals to transmit an infrared signal conveying the remote-control signal. As a result, the transmission range of infrared signals can be made wider than that of the conventional infrared signal transmitting apparatus, without increasing the number of components, the amount of consumed power, and the size of the infrared signal transmitting apparatus due to otherwise a greater number of installed infrared light emitting devices for transmitting low-speed signals.

What is claimed is:

1. An infrared signal transmitting apparatus comprising:

at least one infrared light emitting device for transmitting high-speed signals, at least one infrared light emitting device for transmitting low-speed signals laid out in a way so as to give a wide directivity;

a high-speed-signal driving circuit for driving said infrared light emitting device for transmitting high-speed signals in accordance with a high-speed signal received from a computer;

a low-speed-signal driving circuit for driving said infrared light emitting device for transmitting low-speed signals in accordance with a low-speed signal received from the computer; and logic means connected to said high-speed signal driving circuit said logic means being configured to transmit a high-speed signal or a low-speed signal from the computer to said high-speed-signal driving circuit;

wherein said high-speed-signal driving circuit is driven with said low-speed signal transmitted from said logic means such that said at least one infrared light emitting device for transmitting high-speed signals and said at least one infrared light emitting device for transmitting low-speed signals concurrently emit light signals.

2. An infrared signal transmitting apparatus according to claim 1, further including at least one light receiving device for receiving high-speed signals provided at the same altitude as said infrared light emitting device for transmitting high-speed signals, and high-speed-signal transmitting means for transmitting a high-speed signal received from said light receiving device for receiving high-speed signals to the computer.

3. The infrared signal transmitting apparatus according to claim 1, wherein said at least one infrared light emitting device for transmitting low-speed signals comprises at least three infrared light emitting devices for transmitting low-speed signals and said at least three infrared light emitting devices for transmitting low-speed signals are arranged in three different directions and said at least one infrared light emitting device for transmitting high-speed signals is arranged at a fourth different direction and said at least one infrared light emitting device for transmitting high-speed signals and said at least three infrared light emitting devices for transmitting low-speed signals concurrently emit light signals.

* * * * *